UNITED STATES PATENT OFFICE.

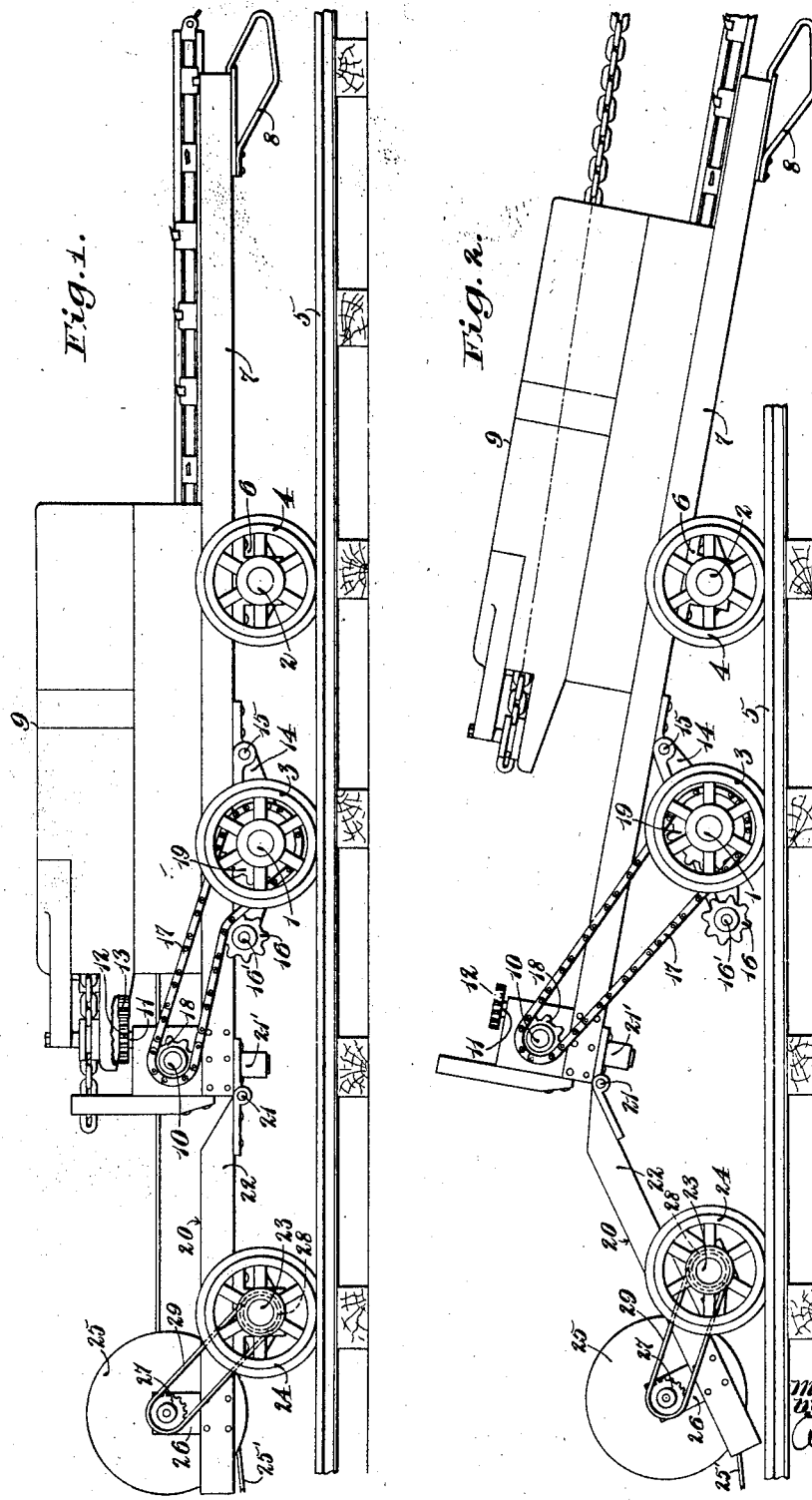

MORRIS P. HOLMES, OF CLAREMONT, NEW HAMPSHIRE, ASSIGNOR TO SULLIVAN MACHINERY COMPANY, A CORPORATION OF MASSACHUSETTS.

TRUCK.

1,378,816. Specification of Letters Patent. Patented May 17, 1921.

Application filed December 12, 1918, Serial No. 266,478. Renewed February 3, 1921. Serial No. 442,329.

*To all whom it may concern:*

Be it known that I, MORRIS P. HOLMES, a citizen of the United States, residing at Claremont, in the county of Sullivan and State of New Hampshire, have invented certain new and useful Improvements in Trucks, of which the following is a full, clear, and exact specification.

My invention relates to trucks, and more particularly to mining machine trucks, the object of the present invention being to provide a counterbalanced, tilting, solid frame truck which will remain in a tilted position after the unloading of the mining machine but which will be automatically returned to a horizontal position when the machine is loaded onto the truck.

This improved truck possesses the advantages of the solid frame trucks now in use in that the bed or main truck frame is solid and substantial, without having the disadvantages of this type of truck in which the rear wheels are raised from the track during the unloading operation and are permitted to fall on the track after the mining machine is unloaded, with a resulting breakage of car wheels, cable reel supports, and, frequently, a derailing of the truck. These and other objects and advantages of my improved construction will hereinafter more fully appear.

In the accompanying drawings I have shown for purposes of illustration one embodiment which my invention may assume in practice.

In these drawings,—

Figure 1 is a side elevation of my improved truck with the mining machine thereon in loaded position.

Fig. 2 is a side elevation of the truck with the mining machine unloading therefrom.

Referring to the drawings, I have there shown, for the purpose of illustrating the principal features of the invention, a four-wheel truck having a plurality of axle members 1 and 2 carrying wheels 3 and 4 adapted to run on rails 5. The front axle 2 is journaled in an axle box 6 which is preferably securely attached to a rigid machine receiving frame or body 7 in such a manner that this frame may be swung on the front axle as a pivot. As shown, this frame extends in front and rear of the two axles and is provided at its front end with a loading shoe 8, the latter being preferably formed of a forwardly extending reversed frame member which limits the swinging movement of the frame and functions as a loading skid to facilitate the loading of the mining machine 9 onto the truck frame.

At its rear end the frame is provided, in a well known manner, with a transverse driving shaft 10 and a substantially vertically disposed shaft 11, the latter being driven by the mining machine 9 through suitable spur gears 12, 13, and in turn driving the shaft 10 through a worm and worm gear, not shown. The rear axle 1, in my improved construction, is mounted in a relatively long axle box 14 hingedly connected at its front end, as shown at 15, to the main frame 7 of the truck. The opposite end of this axle box 14 carries an idler wheel or sprocket 16 rotatably mounted on a rod 16' and adapted to contact with a chain 17 passing over a driving sprocket 18 mounted on the shaft 10 and a relatively large sprocket 19 mounted on the rear axle 1, it being clear from the drawing that as the main frame 7 is tilted from the position shown in Fig. 2 to the position shown in Fig. 1 in which the main frame 7 rests directly on the axle box 14, the idler 16 engages the chain 17 and takes up the slack therein to prevent this chain from jumping either or both of the sprockets. The rod 16' extends from one axle box 14 to an oppositely disposed axle box, and constitutes a tie rod for holding the hinged axle boxes in their proper spaced relation.

With the construction so far described, when the mining machine is moved off from the truck frame or bed, the rear and heavier end thereof will fall, striking the rear axle box a heavy blow, with a possible resultant injury to this box, the idler wheel, or the chain 17, the front end of the frame being at the same time raised from the mine floor so that this frame is not in position to receive the mining machine when it is desired to reload the latter onto the truck.

To obviate this, I have provided a trailer 20 hinged, as shown at 21, to a pivot 21' carried on the rear end of the frame 7 in such a manner as to permit an angular movement of the truck body and trailer as the truck travels along a curved track, the trailer 20 being composed of a frame 22 mounted on an axle 23 carrying wheels 24 adapted to run on the track 5, as is clearly shown in the drawings. A cable drum 25, of the type commonly used in mining machines, is preferably mounted on the rear end of the frame 22 by means of upright supports 26 on each side of the trailer 20, so that the cable drum, frame 22, and axle 23 comprise a first class leverage means operating on the rear end of the frame 7 and tending to elevate that end and depress the opposite end, carrying the shoe, toward the mine floor. The point at which the axle 23 is attached to the frame 22, and the point at which the drum supporting member 26 is attached to said frame, may be so proportioned to the distance between the axle 23 and the hinge 21 that the cable drum 25, which in common practice weighs about three hundred pounds, may be made to counterbalance the main truck 7 on its pivotal support 2 to any degree desired.

In the form of my improvement herein shown, I have provided a reel or drum rotating means adapted to pay out or take in the cable 25', this drum rotating means consisting of sprockets 27, 28 mounted, respectively, on the drum 25 and the axle 23, these sprockets being operatively connected by a flexible chain 29, it being clear from the construction shown that as the trailer is moved to the right, that is, as the machine is advanced along the track, the cable 25' is paid out, and as the machine is moved rearwardly, that is, to the left, the cable is automatically taken in.

By my improved construction I have provided a simple truck and truck driving unit for supporting a mining machine and for transporting the same about a mine. If desired, this truck unit may be used by itself without the trailer 20, but because of the objectionable movement of the frame member 7 to horizontal position as soon as the mining machine is unloaded from the truck, this truck is preferably used with the trailer or counterbalancing unit 20, the latter at all times tending to return the frame 7 from loaded to unloading position, it being clear that when the mining machine is free from the truck the trailer will normally hold the frame 7 in a tilted position in contact with the mine floor. It will be noted that the free end of the frame 22 does not contact with the track, so that when this free end moves downward under the influence of the weight of the reel 25 the reel support will not be broken due to the sudden jar incident to the striking of this member on the rails. It will further be noted that the truck and trailer elements, the connection between the truck and trailer, and the driving means, are very easily constructed, easily repaired, and that the elements have been so placed on the truck and trailer that the resulting structure is very simple, and that any unit thereof may be easily inspected or removed.

While I have in this application specifically described one embodiment which my invention may assume in practice, it is to be understood that this form is shown for illustrative purposes, and that the invention may be modified and embodied in various other forms without departing from its spirit.

What I claim as new and desire to secure by Letters Patent is:

1. In a mining machine truck, a wheeled truck unit comprising a tiltable bed, truck driving mechanism on said bed, and a wheeled counterbalancing unit engaging said bed to normally hold the latter in an inclined position, said units being connected for angular lateral movement.

2. In a mining machine truck, a wheeled unit comprising wheeled supporting elements and a body pivotally mounted on one of said elements, and a wheeled counterbalancing unit engaging said body to normally hold the latter in an inclined position.

3. In a mining machine truck, a wheeled truck unit comprising a tiltable bed, truck driven mechanism on said bed, and a wheeled reel supporting unit engaging said bed to normally hold the latter in an inclined position, said units being connected for angular movement angularly.

4. In a mining machine truck, a wheeled unit comprising wheeled supporting elements and a body pivotally mounted on one of said elements, and a wheeled reel supporting unit engaging said body to normally hold the latter in an inclined position.

5. In a mining machine truck, a wheeled unit comprising wheeled supporting elements, a body pivotally mounted on one of said elements, and trailer means attached to the truck unit and adapted to be moved by said body for normally retaining the body in an inclined position.

6. In a mining machine truck, a wheeled unit comprising wheeled supporting elements, a body pivotally mounted on one of said elements, and wheeled means attached to the truck unit and adapted to be moved by said body for normally retaining the body in an inclined position.

7. In a mining machine truck, a wheeled unit comprising wheeled supporting elements, a body pivotally mounted on one of said elements, truck driving means mounted on said unit, and reel supporting means attached to the truck unit and adapted to be moved by the latter for normally retaining the body in an inclined position.

8. In a mining machine truck, a wheeled truck unit comprising front and rear wheels and a bed, said bed being tiltable by a mining machine movable thereover, and a wheeled reel supporting unit engaging said bed to normally hold the latter in an inclined position, said last named unit including means for rotating the reel.

9. In a mining machine truck, a wheeled unit comprising two wheeled supporting elements, a body pivotally mounted on one of said elements and tiltable by a mining machine movable thereover to loaded or loading position, the other element being hingedly connected to said body and adapted to support the body when the latter is in loaded position, and a wheeled counterbalancing unit hingedly connected to said body for normally retaining the latter in a loading position.

10. In a mining machine truck, a wheeled unit comprising two wheeled supporting elements, a body pivotally mounted on one of said elements and tiltable by a mining machine movable thereover to a loaded or unloading position, truck driving means on said body and the other wheeled element and including a flexible driving member and take up means therefor, and a wheeled reel supporting unit hingedly connected to said body for normally retaining the latter in an unloading position.

11. In a mining machine truck, a wheeled machine receiving frame tiltable by a machine movable thereover, a wheeled trailer disposed in rear thereof, and operative connections between said elements whereby said frame is supported in tilted position by said trailer.

12. In a mining machine truck, a wheeled machine receiving frame tiltable by a machine moving thereover, a wheeled trailer disposed in rear thereof, and pivotal connections between the rear end of said receiving frame and the front end of said trailer.

13. In a mining machine truck, a wheeled machine receiving frame tiltable by a machine movable thereover, a tiltable wheeled trailer disposed in rear of said receiving frame and tiltable to support the latter in tilted position, means pivotally connecting said trailer to the rear end of said frame, and a reel carried on said trailer in rear of the axis thereof.

14. In a mining machine truck, a wheeled machine receiving frame tiltable by a machine movable thereover, a tiltable wheeled trailer disposed in rear thereof and tiltable by said frame into position to support the latter in tilted position, a reel carried on said trailer, and truck driving mechanism carried by said frame.

15. In a mining machine truck, a machine receiving frame tiltable by a machine movable thereover, a wheeled support pivotally connected thereto, and disposed beneath said frame, and a wheeled trailer pivotally connected to the rear end of said frame and movable into position to support the latter in tilted position.

16. In a mining machine truck, a wheeled machine receiving frame tiltable by a machine movable thereover, a wheeled support pivotally connected thereto, a wheeled trailer pivotally connected to the rear end of said member, truck driving mechanism carried on the rear end of said frame, and a reel carried on said trailer.

17. In a mining machine truck, a wheeled machine receiving frame tiltable by a machine movable thereover, a wheeled trailer disposed in rear thereof, and operative connections to the rear end of the former for elevating the front end of said trailer to support the rear end of said frame when the front end of the latter is depressed.

18. In a mining machine truck, a wheeled machine receiving frame tiltable by a machine movable thereover, a wheeled trailer disposed in rear thereof, and operative connections to the rear end of the former for elevating the front end of said trailer to support the rear end of said frame or depressing said front end when said receiving frame is reversely tilted.

19. In a mining machine truck, a wheeled machine receiving frame tiltable by a machine movable thereover, a wheeled support pivotally connected thereto, a wheeled trailer pivotally connected to the rear end of said frame, truck driving mechanism carried on the rear end of said frame, a reel carried on said trailer, and operative connections for said truck driving mechanism and reel operatively connected to the wheels on said support and trailer respectively.

20. In a mining machine truck, a tiltable mining machine supporting frame, a wheeled axle about which said frame is adapted to pivot in tilting, a wheeled axle supporting counter-balancing unit pivotally connected to the frame to normally hold the latter in an inclined position, and means for permitting movement of said axles into or out of parallelism.

21. In a mining machine truck, a tiltable mining machine supporting frame, a wheeled axle about which said frame is adapted to pivot in tilting, a wheeled axle supporting counter-balancing unit pivotally connected to the frame to normally hold the latter in an inclined position, and means intermediate said unit and said frame for permitting movement of said axles into and out of parallelism.

22. In a mining machine truck, a mining machine supporting frame, a wheeled axle about which said frame may pivot to tilt in a vertical plane, and a single axle wheeled unit pivotally connected to said frame, said pivotal connection comprising a vertical pivot.

23. In a mining machine truck, a mining machine supporting frame, a wheeled axle about which said frame may pivot to tilt in a vertical plane, and a single axle wheeled unit having a pivotal connection about a vertical pivot with said frame.

24. In a mining machine truck, a machine receiving frame having a wheeled axle thereunder about which said frame is adapted to pivot in tilting in a vertical plane, a wheeled support pivotally connected thereto, a wheeled unit pivotally connected to the rear end of said member and coöperating with the latter to maintain the same in tilted position, truck driving mechanism carried on the rear end of said frame, and a reel carried on said unit.

25. In a mining machine truck, a machine receiving frame having a wheeled axle thereunder about which said frame is adapted to pivot in tilting in a vertical plane, a wheeled support pivotally connected thereto, a wheeled unit pivotally connected to the rear end of said frame, truck driving mechanism carried on the rear end of said frame, a reel carried on said unit, and operative connections between said truck driving mechanism and reel and the wheels on said support and unit respectively.

In testimony whereof I affix my signature.

MORRIS P. HOLMES.